Patented Aug. 28, 1934

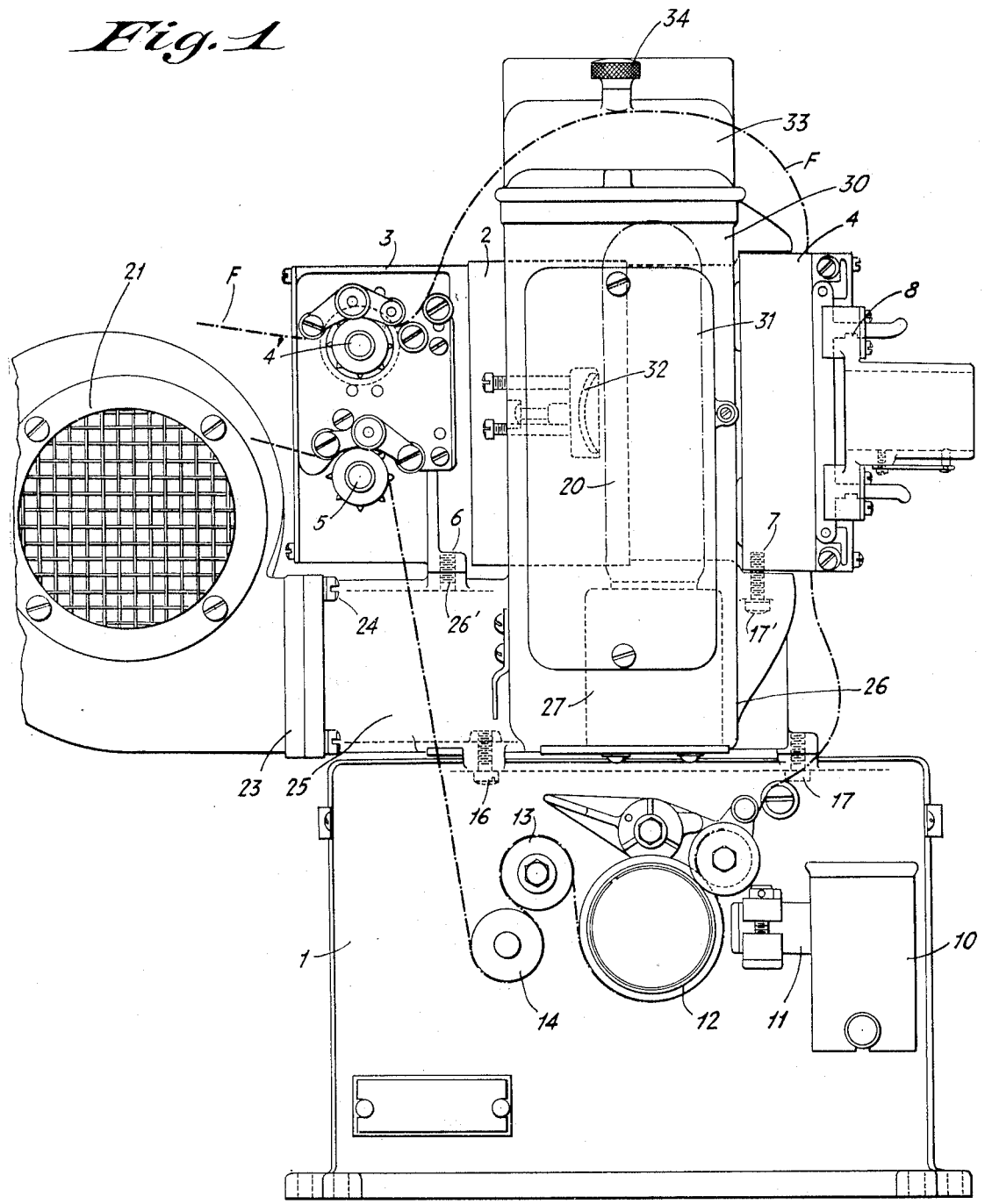

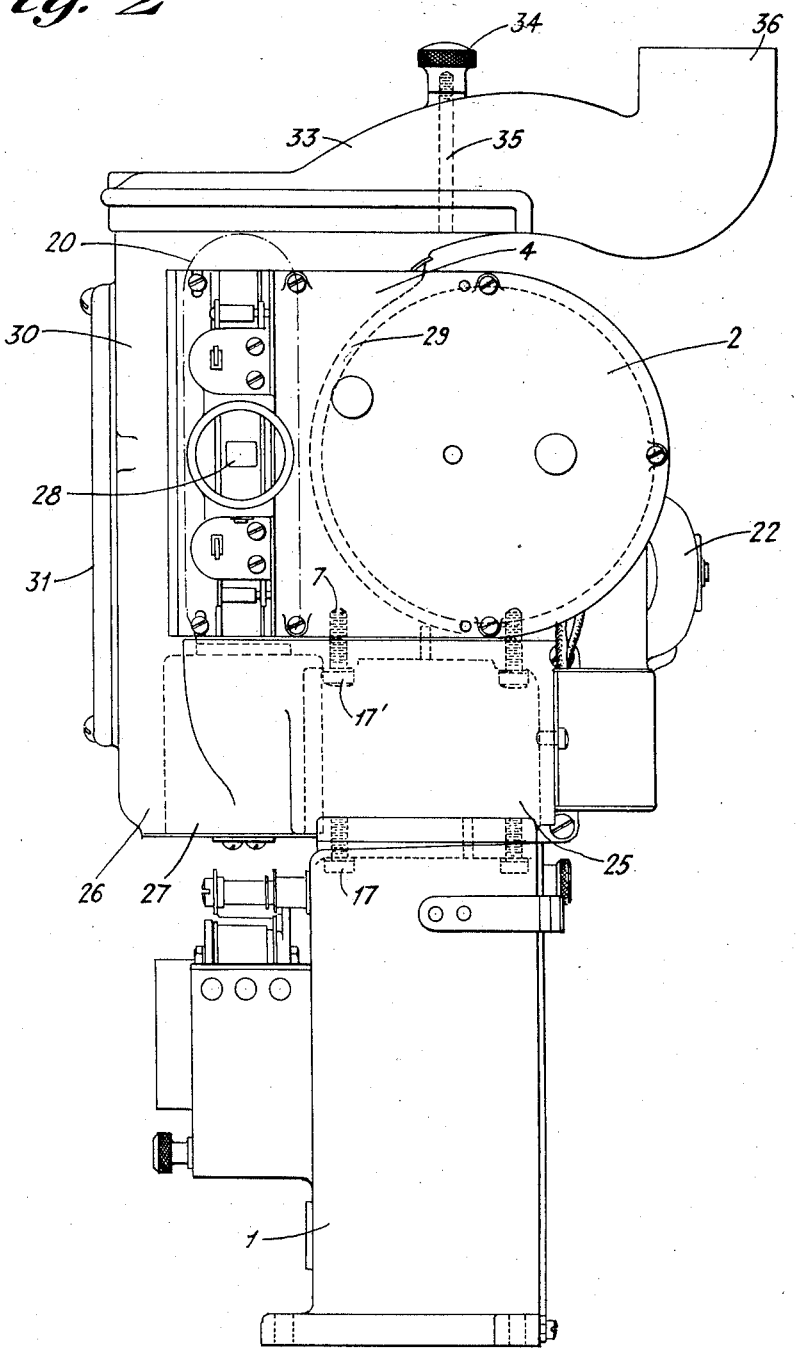

1,971,454

UNITED STATES PATENT OFFICE 1,971,454

MOTION PICTURE APPARATUS

Fred J. Loomis, Haddonfield, N. J., assignor to Radio Corporation of America, a corporation of Delaware Application July 25, 1932, Serial No. 624,443

1 Claim. (Cl. 88—24)

This invention relates to motion picture apparatus, and more specifically to a cooling system which is adapted to be attached to commercial types of motion picture apparatus and particularly 16 mm. motion picture apparatus for the purpose of adapting them to the use of lamps of very high candle power. There are on the market a number of types of 16 mm. motion picture projectors which are adapted to use satisfactorily lamps of wattages of the order of 150 to 250 and which operate safely and satisfactorily with lamps of such power. However, in order to satisfactorily project pictures on larger screen areas, it becomes necessary to use lamps of increased wattage such, for example, as the 400 watt lamps provided with "bi-plane" filaments such as are now on the market. The use of lamps of this nature makes necessary the provision of a cooling system to prevent softening of the walls of the lamp within the lamphouse, and also for cooling the film and film apertures. It is undesirable to manufacture all projectors of a given type in two different models, one to accommodate a low power lamp and one to accommodate a high power lamp, and it is equally undesirable to restrict the design to a lamp of high power on account of the amount of screen consumed thereby and the extreme brilliancy of small images produced therefrom or to a lamp of low wattage on account of the insufficiency of screen illumination.

In my invention I have provided what may be either considered a part of or attachment for a projector whereby lamps of considerably higher wattage may be used in any given projector than would be used without said attachment or part, and at the same time this attachment or part may be omitted during manufacture and a small lamphouse substituted and the projector then used with lamps of lower wattage.

One object of the invention is to provide a projector which is readily interchangeable to adapt it for use of lamps of high or low wattage.

Another object of the invention is to provide an inexpensive and dependable means for cooling the lamphouse and film aperture when lamps of high wattage are used.

Another object of the invention is to provide such a cooling means which may be fitted to projectors of commercial type on the market to adapt them for use on lamps of high wattage and without any material changes in the said projector.

Another object of the invention is to provide such a device which will continue to cool the lamp, lamphouse and film even though the projector motor be stopped.

Another object of the invention is to provide such a device which, although optionally useable, will present the characteristics of being a portion of the machine rather than merely being an attachment added thereto.

Another object of the invention is the provision of such a projector including a cooling mechanism which will be compact, light and efficient.

Another object of the invention is to provide a sufficiently effective cooling mechanism to permit the film to be run immediately over and under the lamphouse without danger of ignition thereof or damage thereto.

Another object of the invention is the provision of such an air-cooled lamphouse which is of rigid and substantial construction so as to adequately mechanically protect the lamp.

Another object of the invention is the provision, in conjunction with such an air-cooled lamphouse, of means whereby the lamp may be quickly and conveniently removed therefrom in case it should burn out, or for any other reason for being replaced.

In the drawings:

Fig. 1 is a side view of a talking motion picture projector including my invention.

Fig. 2 is a view from the right-hand end of Fig. 1.

These figures illustrate my invention as applied to the commercial type of 16 mm. talking motion picture equipment which is generally known as the "RCA Victor type PG-38 equipment" and as disclosed in detail in application of Russell P. May Serial No. 572,804 filed November 3, 1931. This particular projector includes a base portion 1 which is adapted to carry a motion picture projector indicated generally by the reference numeral 2.

The motion picture projector mechanism is built on and into an electric motor of suitable type, the end-bells of the said motor indicated at 3 and 4 carrying the entire mechanism thereof. The rear end-bell 3 carries a pair of sprockets 4' and 5 which feed the film F into and out of the entire apparatus. The film passes from the sprocket 4' through the film gate indicated generally at 8 and which is provided near its bottom with an intermittent film feeding means, the mechanism of which is encased in the end-bell 4 and the film thence passes downward toward the base member 1. This base member carries the sound pick-up mechanism. An exciter lamp is housed within the casing 10 and light therefrom is projected by the optical system 11 in the form of a fine line upon the film as it travels around the drum 12. The soundtrack portion of the film overhangs the inner side of this drum, and the light passes through the sound-track and is thereafter reflected to the interior of the base member 1 where it strikes a photoelectric cell housed therewithin. This photoelectric cell and its amplifier are shielded mechanically and electrically by this base member 1. After leaving the drum 12 the film passes around the rollers 13 and 14 which assist the drum 12 in causing the film to move at a uniform speed past the optical system 11, and the film then passes upwardly to the sprocket 5 and out to the take-up reel.

In this machine as manufactured for use with a low wattage lamp, the body 2 of the motor, and the end-bells thereof 3 and 4 rest directly on top of the base member 1 and the projector portion of the mechanism is provided with screw holes 6 and 7 into which the screws 16 and 17 are inserted to hold the projector member upon the base member 1.

When the machine is thus assembled for the use of a low wattage lamp, a lamphouse is attached at the side of the motor 2 to the rear of the end-bell 4 and with the projection lamp therein in proper alignment with the projection aperture.

In order to adapt this machine to the use of a high-wattage projection lamp 20, I provide a different lamphouse and an appropriate cooling mechanism;

Air for the cooling mechanism is supplied by a centrifugal blower 21 which is driven by a small electric motor 22 mounted at the rear of the projector and connected in parallel with the lamp and other motor circuits so that the motor 22 will be in operation at all times when the lamp 20 is turned on. The motor 22 is carried by the casing of the blower 21, and this casing in turn is supported at the flange 23 to which it is secured by the screws 24.

An air conduit 25 is secured to the base member 1 by the screws 16 and 17 and additional screws 16' and 17' secure the motor 2 and an attendant mechanism to the top of the member 25. It should be noted that this requires no change in either of these portions of the assembly other than the provision of additional screws, and the conduit 25 is made of sufficient strength to maintain the other two portions rigidly in proper relation to each other.

The conduit 25 is provided with a lateral extension 26 into which the air can pass, and which constitutes the bottom portion of the lamphouse and contains the socket 27 which supports the lamp 20 in proper relation to the projection aperture 28. The walls continue upwardly from the portion 26 and form the body of the lamphouse which, as shown in Fig. 2, passes rather closely around the body of the motor 2 and provides a slight air space 29 between the wall of the lamphouse and the body of the motor in order to avoid overheating of the motor from radiation.

The lamphouse is generally referred to by the reference numeral 30 and is provided at its outer side with a cover plate 31 which may be removed to give access to the interior of the lamphouse for the purpose of adjusting the lamp or the reflector 32. The top of the lamphouse consists of the cover member 33 which is held in proper alignment therewith by a dowel pin and stud and is firmly secured thereto by the knurled nut 34 upon the stud 35. This cover 33 provides an air passage extending to the right in Fig. 2 and terminates in an upwardly extending exit portion 36 which directs the heated air upward and away from the projector.

The lamp 20 may be removed by removal of the nut 34 when the entire cover member 33—36 may be lifted off, thereby giving access to the interior of the lamphouse.

The configuration of the cover 33 is such that, as shown in Fig. 1, the film may pass over the top thereof without coming in contact with the surface, and the heated air is directed laterally to such a distance that none of it can impinge upon the film. It is thereby made possible to safely use a high wattage lamp in this type of projector where lamp, reels, and projection aperture are all in alignment and the film is caused to pass over and under the lamp.

The provision of the motor 22 independent of the motor 2 insures that the blower will continue to operate even though the film feeding mechanism should fail due to either failure of motor 2 or to a fault in the mechanical portion of the device, and the probability of ignition of the film is thereby decreased. The lamphouse 30 has, of course, an aperture at the front in proper cooperative relation with the projection aperture 28 and a certain amount of the air forced into the lamphouse 30 from the conduit 25 escapes through this aperture to the film gate and the film at the projection aperture, both of which it assists in cooling.

It will be seen that I have thus provided a mechanism or apparatus which is capable of assembly for use with either high or low wattage lamps, and I have accomplished this without requiring a large number of differently designed parts for the two purposes, which latter would greatly increase production costs due to increased stocks of parts required and decreased numbers of parts produced of any one type.

I claim:

Motion picture apparatus comprising a base unit, a projector unit adapted to be supported upon said base unit and secured thereto, and an air cooling unit, means thereon adapted to be secured upon said base unit and means thereon for securing the projector unit in the same manner as the projector unit would have been secured to the base unit, whereby the projector unit may be selectively mounted either directly upon the base unit or upon the said air cooling unit which in turn may be mounted upon the base unit.

FRED J. LOOMIS.